April 29, 1930.  W. VERNET  1,756,713
RUBBER SPONGE SOAP DISH
Filed Dec. 3, 1929
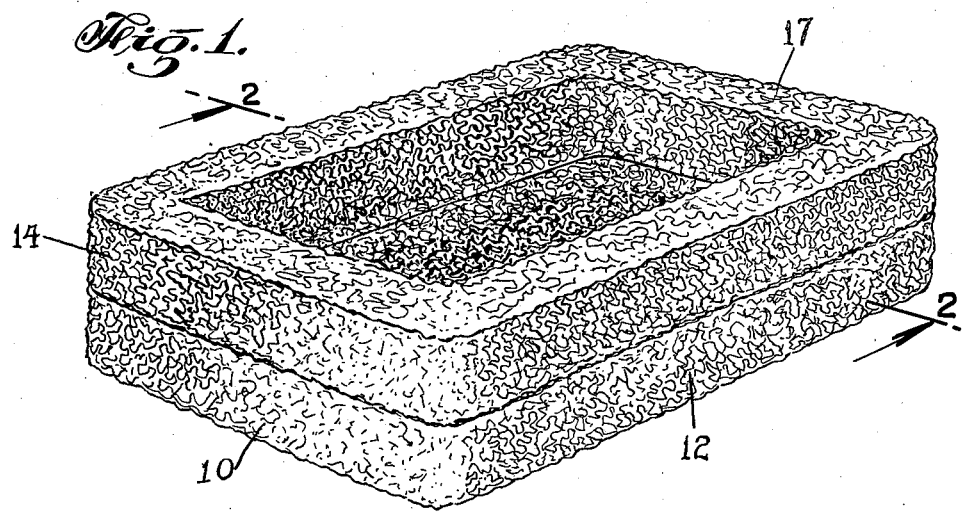
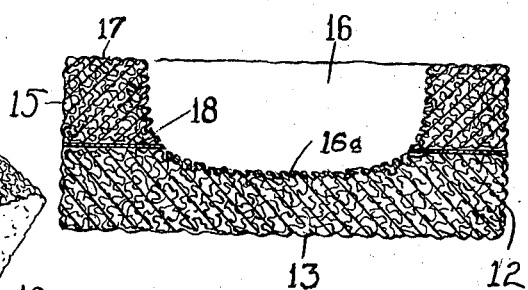
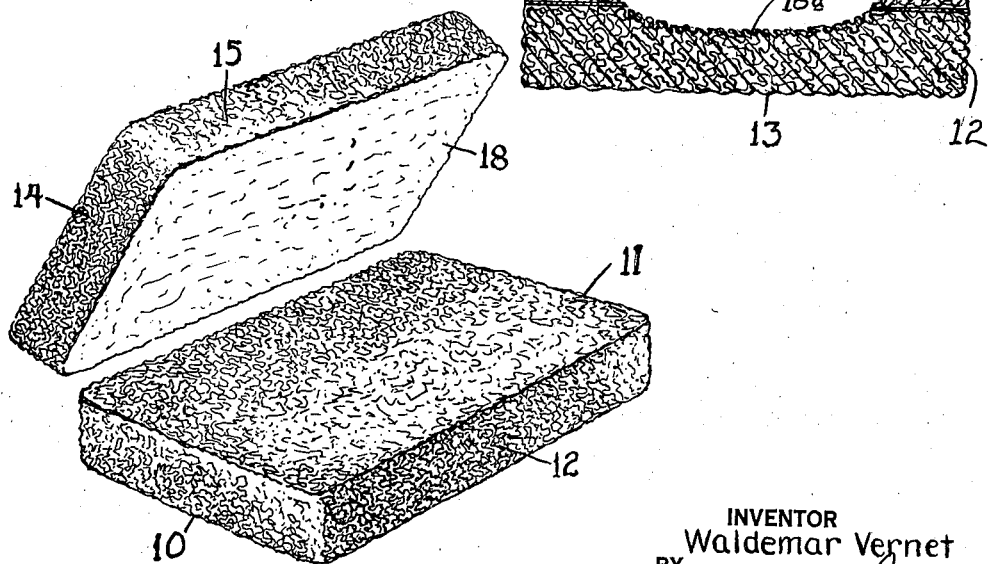
INVENTOR
Waldemar Vernet
BY
ATTORNEY Patented Apr. 29, 1930

1,756,713

UNITED STATES PATENT OFFICE

WALDEMAR VERNET, OF NEW YORK, N. Y.

RUBBER-SPONGE SOAP DISH

Application filed December 3, 1929. Serial No. 411,274.

This invention relates to an improvement in sponge rubber articles and has particular relation to an artificial rubber sponge soap dish and is an improvement on the soap dish described in my prior U. S. Letters Patent, No. 1,659,644 patented February 21, 1928.

Sponge rubber soap dishes of the type manufactured under my said prior patent, while highly desirable because of their sanitary, easy cleaning features, are subjected in use to the constant action of soapy water, which has the effect of softening the texture of the sponge and in extreme cases making the dish flabby so that it is not stiff enough to hold its shape well or to be handled with a soap cake therein. It is difficult to satisfactorily reinforce a one piece sponge soap dish without introducing some noncompressible element which would interfere with the ease of cleaning which is one of the prime requisites of a rubber sponge soap dish.

It is the principal object of this invention, however, to provide a soap dish which is made entirely of sponge rubber, suitably cut to form a hollow depression in the center thereof and having a bond or reenforcement near the bottom of the center depression, which strengthens the dish and preserves the shape thereof.

Another object of my invention is to provide a rubber sponge soap dish which is made out of at least two pieces of rubber sponge suitably cemented together to stiffen the same and having a center soap cake receiving recess.

Another object of this invention is to provide a porous absorbent and readily compressible soap dish having a reenforcement in the walls thereof adapted to prevent the sponge from tearing or losing its shape but not interfering with its porosity, or compressibility for cleaning.

Another object of my invention is to provide a rubber sponge soap dish made of two parts suitably cemented or vulcanized together and having a skin or reenforcement between the respective portions and having a center depression the bottom of which is below the plane of the reenforcing skin.

Another object is to provide a soap dish which may be easily and quickly cleaned and which may be made of two or more portions or sections of porous sponge rubber and which may be made of different colors.

Another object of my invention is to provide a rubber sponge soap dish of differently colored portions and having a center cake receiving receptacle extending entirely through one of the sections of the sponge rubber and into the other section.

Further objects and advantages of my invention will appear from the following description thereof taken in conjunction with the attached drawings which illustrate a preferred form of embodiment to which the invention is adapted and in which:

Figure 1 is a perspective view of the sponge rubber container or soap dish.

Figure 2 is a vertical section substantially on the line 2—2 of Figure 1.

Figure 3 is a view similar to Figure 1, showing the two portions separated and the bond or skin removed from the lower portion of the soap dish before the blocks are cemented together.

In the form of embodiment of the soap dish illustrated herein, the dish or container comprises a lower or base portion having the end walls 10, side walls 12 and top surface 11 from which the skin has been removed. The skin has also been removed from the bottom surface 13 of the base portion.

The upper portion or layer comprises the end walls 14, side walls 15, central depression 16, top surface 17, from which the skin has been removed and the lower surface having the skin 18 thereon.

The two layers are preferably cut out of a large sheet of artificial sponge rubber and usually are cut simultaneously after the two sheets have been properly cemented together, although they may, of course, be cut separately and then cemented together. This insures the uniformity of size in the upper and lower portions. The skin may desirably be removed before the stamping out of the individual blocks.

The skin 18, which is common to artificial porous sponge rubber may be left upon one or both of the adjacent faces of the upper and lower portions and/or may be removed from both portions. Preferably one skin is left and the other portion, having been skinned can be very satisfactorily cemented thereto and a very strong bond is thus obtained. The cement or other means for securing the two blocks together should be sufficient to stiffen the blocks and hold them in shape as the depression 16 is cut therein; the cut may extend into the lower block at the point 16ª as shown.

After the blocks have been suitably prepared and secured, one to the other, the center depression may be formed preferably by forcing the central part of the base portion upward and depressing the walls 17 of the upper portion and then slicing off the projecting part above the walls in the manner described in my copending application Serial No. 327,648, filed December 21, 1928. After the compression on the walls 17, is removed and the center is allowed to return to its normal position, it will be found that a substantially uniform shallow depression 16, suitable for receiving and retaining a cake of soap will be provided. This depression 16 preferably extends below the surface of the skin 18, although this is not necessary, and may extend into the top 16ª of the lower blocks so that by viewing the soap dish from the top through the depression 16 the lower or base portion 16ª will be directly observed. This is particularly indicated in Figure 2 and it is obvious that under such circumstances the skin or joint between the upper portion and the base portion will be even with or slightly above the bottom of the opening, so as to provide a reenforcing or stiffening layer around the edges of the soap receiving depression.

The nature of this joint due either to the presence of the skin 18 or the adhesive used is such that it materially reenforces the soap dish at a point where the greatest softening due to the soapy water takes place. It materially strengthens the soap dish laterally and yet does not interfere with the porosity of the receptacle in passing water or soap therethrough and does not interfere with its appearance, or compressibility for cleaning. By using a different colored base and upper portion a colorful ring or rim can be provided over the base which adds to the attractiveness of the soap container. This soap container is therefore of great strength having a skin or reenforced element above the base around the center depression and the soap container may be made of different colored material, be more attractive and of greater utility.

While I have shown a preferred form of embodiment of this device it is understood that other modifications might be made therein and I therefore desire a broad interpretation of my invention within the scope and spirit of the disclosure herein and of the claims appended hereinafter.

I claim:

1. As a new article of manufacture, a sponge rubber soap dish made of two pieces, one forming a bottom and the other upstanding walls forming a rim for said bottom, one of said pieces having the integral substantially nonporous rubber skin left thereon, said bottom and said walls being made of sponge rubber readily compressible, non-warping, and not decomposed by the constant presence of moisture, said bottom portion and said wall portions being cemented together with said skin therebetween to stiffen and reinforce said dish.

2. As a new article of manufacture, a sponge rubber soap dish made of two pieces, one forming a bottom and the other upstanding walls forming a rim for said bottom, one of said pieces having the integral substantially nonporous rubber skin left thereon, said bottom and said walls being made of sponge rubber readily compressible, non-warping, and not decomposed by the constant presence of moisture, said bottom portion and said wall portions being cemented together with said skin therebetween to stiffen and reinforce said dish, and a depression extending into the bottom portion to form an all-porous soap receiving compartment.

In testimony whereof I have affixed my signature to this specification.

WALDEMAR VERNET.